US007684318B2

United States Patent
Wentink et al.

(10) Patent No.: US 7,684,318 B2
(45) Date of Patent: Mar. 23, 2010

(54) SHARED-COMMUNICATIONS CHANNEL UTILIZATION FOR APPLICATIONS HAVING DIFFERENT CLASS OF SERVICE REQUIREMENTS

(76) Inventors: Maarten Menzo Wentink, Oudegracht 3A, 3511AB Utrecht (NL); Ronald A. Brockmann, Biltstraat 140, 3572BL Utrecht (NL)

(*) Notice: Subject to any disclaimer, the term of this patent is extended or adjusted under 35 U.S.C. 154(b) by 1207 days.

(21) Appl. No.: 10/383,339

(22) Filed: Mar. 7, 2003

(65) Prior Publication Data

US 2003/0181212 A1 Sep. 25, 2003

Related U.S. Application Data

(60) Provisional application No. 60/363,342, filed on Mar. 8, 2002.

(51) Int. Cl.
H04L 12/28 (2006.01)
H04L 12/56 (2006.01)
H04J 3/16 (2006.01)
H04J 3/22 (2006.01)

(52) U.S. Cl. .................. 370/229; 370/412; 370/468
(58) Field of Classification Search ......... 370/229, 370/230, 235, 412
See application file for complete search history.

(56) References Cited

U.S. PATENT DOCUMENTS

| | | | | |
|---|---|---|---|---|
| 5,592,476 | A | * | 1/1997 | Calamvokis et al. ........ 370/390 |
| 6,067,301 | A | * | 5/2000 | Aatresh ...................... 370/418 |
| 6,272,109 | B1 | * | 8/2001 | Pei et al. ..................... 370/230 |
| 7,116,640 | B2 | * | 10/2006 | Tasman et al. .............. 370/252 |
| 2002/0089994 | A1 | * | 7/2002 | Leach et al. ................. 370/412 |
| 2002/0101820 | A1 | * | 8/2002 | Gupta et al. ................. 370/229 |
| 2002/0105965 | A1 | * | 8/2002 | Dravida et al. ............. 370/463 |
| 2002/0154653 | A1 | * | 10/2002 | Benveniste ................... 370/447 |
| 2003/0012166 | A1 | * | 1/2003 | Benveniste ................... 370/338 |
| 2003/0035442 | A1 | * | 2/2003 | Eng ........................... 370/486 |
| 2003/0103500 | A1 | * | 6/2003 | Menon et al. ............... 370/389 |
| 2004/0013134 | A1 | * | 1/2004 | Hautala ....................... 370/476 |
| 2007/0019665 | A1 | * | 1/2007 | Benveniste ................... 370/445 |

FOREIGN PATENT DOCUMENTS

EP 0 658 999 A 6/1995
EP 0 680 173 A1 11/1995

OTHER PUBLICATIONS

Tanenbaum, A S: "Computer Networks" Computer Networks, London: Prentice-Hall International, GB, 1996, pp. 381-384, XP002166981, ISBN: 0-13-394248-1, pp. 381-384, figure 5-26.

* cited by examiner

*Primary Examiner*—Kevin C Harper
(74) *Attorney, Agent, or Firm*—McDonnell Boehnen Hulbert & Berghoff LLP

(57) ABSTRACT

A technique is disclosed that enables latency-tolerant and latency-intolerant applications to intelligently share a shared-communications channel in a manner that seeks to satisfy the needs of all of the applications. In particular, the illustrative embodiment enables each application to be associated with a different class of service, wherein each class of service is associated with one or more quality-of-service parameters (e.g., minimum throughput, maximum latency, etc.). The illustrative embodiment then effectively apportions access to the shared-communications channel by regulating different degrees of bursting (i.e., the transmission of multiple frames at a single transmission opportunity) based on the class of service associated with the application.

17 Claims, 4 Drawing Sheets

SHARED-COMMUNICATIONS CHANNEL UTILIZATION FOR APPLICATIONS HAVING DIFFERENT CLASS OF SERVICE REQUIREMENTS

CROSS-REFERENCE TO RELATED APPLICATIONS

This application claims the benefit of U.S. provisional patent application Ser. No. 60/363,342, filed on Mar. 8, 2002, and entitled "Method Of Differentiating And Preserving Network Transmissions," which is also incorporated by reference.

FIELD OF THE INVENTION

The present invention relates to telecommunications in general, and, more particularly, to a technique for enabling the stations in a local area network to intelligently use their shared-communications channel.

BACKGROUND OF THE INVENTION

FIG. 1 depicts a schematic diagram of telecommunications system 100 in the prior art. Telecommunications system 100 transmits signals between communication stations 101-1 through 101-P, wherein P is a positive integer, over shared-communications channel 102. Because stations 101-1 through 101-P share shared-communications channel 102, they have to follow rules (or "protocols") that govern, among other things, when and for how long they can each use the channel.

Many types of applications (e.g., e-mail, ftp, http, voice, video, etc.) send data across a local area network. The data for some of these applications—e-mail and web browsing for example—can be send with a lesser degree of urgency and, therefore, are called "latency-tolerant." In contrast, the data for some other applications—particularly those that comprise a real-time component like video and audio—must traverse the network with a greater degree of urgency. These applications are called "latency-intolerant."

IEEE 802.11 local area networks were initially designed for latency-tolerant applications and typically each of those applications share access to the shared-communications channel on an equal basis. This is usually acceptable for latency-tolerant applications. In contrast, this is often unacceptable for latency-intolerant applications because giving equal access to latency-tolerant and latency-intolerant applications might prevent the latency-intolerant application from getting its data in a timely manner.

If the latency-intolerant applications is deemed to be important, then a mechanism must be introduced into the network so that the latency-intolerant applications are given the amount of resources they need in a timely manner. Therefore, the need exists for a technique for enabling latency-tolerant and latency-intolerant applications to intelligently share access to the shared-communication channel.

SUMMARY OF THE INVENTION

The present invention enables latency-tolerant and latency-intolerant applications to intelligently share a shared-communications channel in a manner that seeks to satisfy the needs of all of the applications. In particular, the illustrative embodiment enables each application to be associated with a different class of service, wherein each class of service is associated with one or more quality-of-service parameters (e.g., minimum throughput, maximum latency, etc.).

The illustrative embodiment then effectively apportions access to the shared-communications channel by having the station transmit multiple frames at a single transmission opportunity (i.e., bursting) and by regulating the number of frames in each burst based on the class of service associated with the application.

Bursting is known in the prior art as a technique for increasing the bandwidth utilization of a shared-communications channel. In contrast, the illustrative embodiment utilizes bursting, and regulates the number of frames in each burst, to balance the needs of applications having different class of service parameters.

In the context of IEEE 802.11 local area networks, the illustrative embodiment is advantageous because it does not require a change to 802.11's coordination function (e.g., distributed coordination function, enhanced distributed coordination function, point coordination function, etc.). Furthermore, stations in accordance with the illustrative embodiment continue to gain access to the shared-communications channel on a statistically-equal basis, although higher-class-of-service applications are able to transmit more frames at each transmission opportunity than are lower-class-of service applications. The result is that applications having different class of service parameters are treated differently, yet while the statistical properties of the access coordination function remain unchanged.

An illustrative embodiment of the present invention comprises: queuing m frames in a queue; and transmitting a maximum of n frames of the m frames into a shared-communications channel when presented with an opportunity to transmit all m frames into the shared-communications channel; wherein m and n are positive integers and m>n.

DETAILED DESCRIPTION

Figure 1:
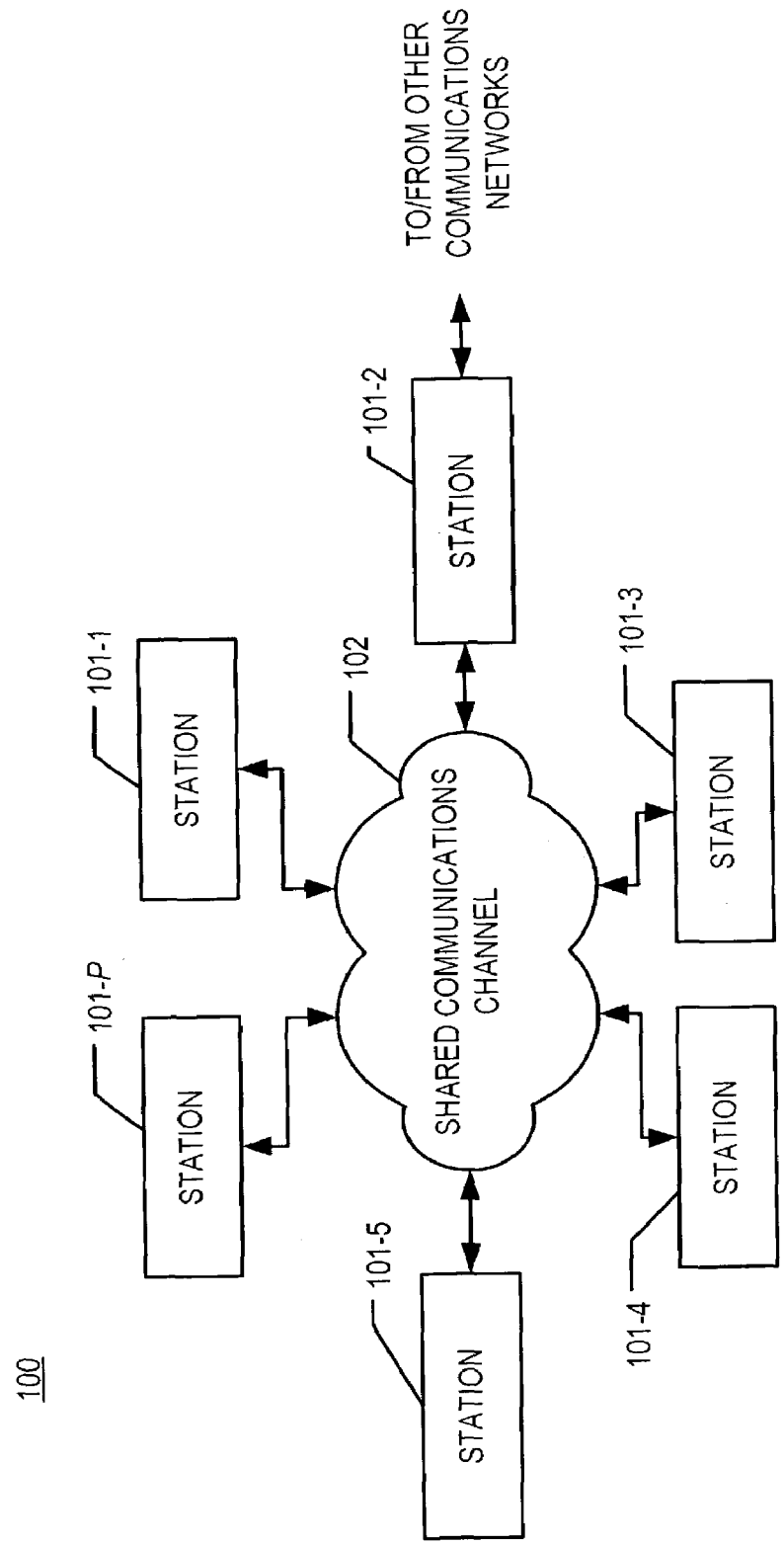
FIG. 1 depicts a schematic diagram of telecommunications system 100 in the prior art.
Figure 2:
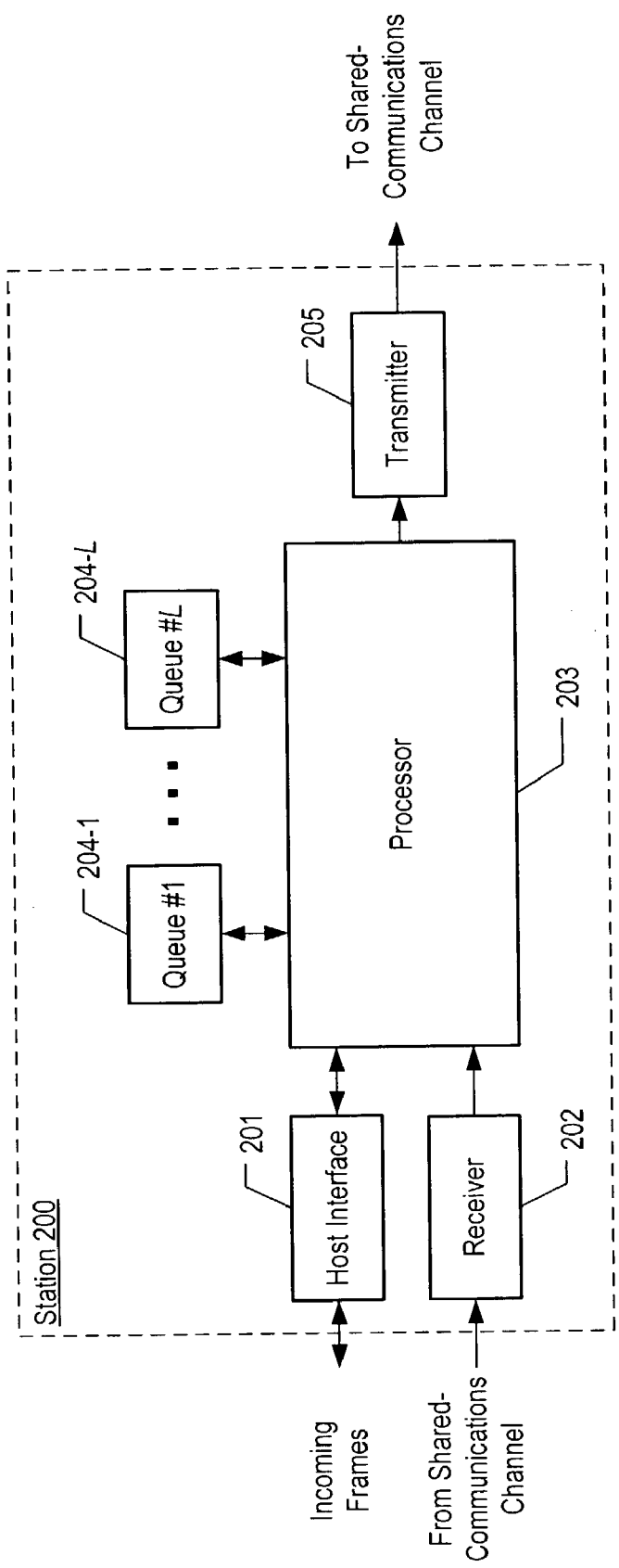
FIG. 2 depicts a block diagram of the salient components of a station in accordance with the illustrative embodiment of the present invention.

FIG. 2 depicts a block diagram of the salient components of an IEEE 802.11 station in accordance with the illustrative embodiment of the present invention. Station 200 is capable of receiving a succession of frames from one or more sources and of segregating, queuing, and transmitting the frames based on their class of service.

Station 200 comprises: host interface 201, receiver 202, processor 203, queues 204-1 to 204-L, wherein L is a positive integer greater than one, and transmitter 205, interconnected as shown.

Host interface 201 a circuit that is capable of receiving data and instructions from a host (not shown), in well-known fashion, and of forwarding them to processor 203. Furthermore, host interface 201 enables station 200 to send data and status indicators to the host. It will be clear to those skilled in the art how to make and use host interface 201.

Receiver 202 is a circuit that is capable of receiving frames from shared-communications channel, in well-known fashion, and of forwarding them to processor 203. The frames include both data frames and control frames, such as request-to-send, clear-to-send, and acknowledgement frames.

Processor 203 is a general-purpose processor that is capable of performing the tasks described below and with respect to FIGS. 3 and 4. It will be clear to those skilled in the art, after reading this specification, how to make and use processor 203.

Queues 204-i, for i=1 to L, are each first-in, first-out memories. Each of queues 204-1 through 204-L are uniquely associated with application i, which is associated with a class of service. In accordance with the illustrative embodiment, each class of service is associated with one or more quality-of-service parameters (e.g., minimum throughput, maximum latency, etc.).

Each of queues 204-1 through 204-L holds one or more frames pending transmission by station 200 on the shared communications channel. It will be clear to those skilled in the art how to make and uses queues 204-1 through 204-L.

Transmitter 205 is a circuit that is capable of receiving frames from processor 203, in well-known fashion, and of transmitting them on the shared communications channel.

Figure 3:
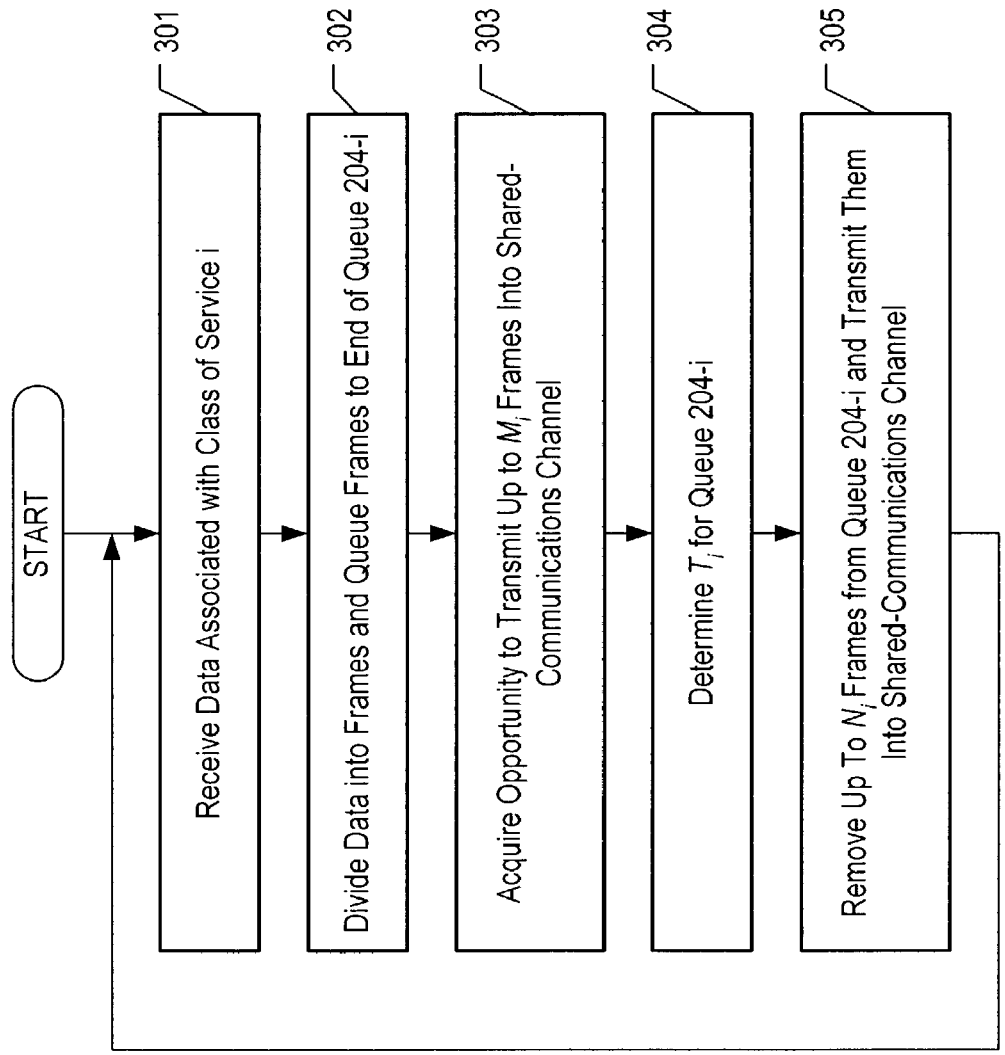
FIG. 3 depicts a flowchart of the illustrative embodiment of the present invention.

FIG. 3 depicts a flowchart of the salient tasks performed by the illustrative embodiment of the present invention.

At task 301, host interface 201 receives data and instructions from a host that indicate that the data is to be transmitted onto the shared-communications channel and that the data is associated with application i.

At task 302, processor 203 receives the data from host interface 201, divides the data into frames, in well-known fashion, and queues the frames onto the end of queue 204-i.

At task 303, station 200 acquires, in well-known fashion, an opportunity to transmit one or more frames associated with application i. In accordance with the illustrative embodiment, this opportunity enables station 200 to transmit a burst of up to M frames over shared-communications channel, where M is a positive integer.

Because station 200 operates in accordance with IEEE 802.11, station 200 becomes aware of a transmission opportunity in accordance with the distributed coordination function, the extended distributed coordination function, or the point coordination function. It will be clear to those skilled in the art how to make and use embodiments of the present invention that use different medium access control protocols.

Processor 203 continually determines from which one of queues 204-1 through 204-L to next draw frames at the next transmission opportunity. In other words, conceptually queues 204-1 through 204-L in station 200 are vying with each other for transmission opportunities. For example, the queue whose frames are to be transmitted at the next transmission opportunity can be based on, for example, i. a round robin scheme, or
ii. a random scheme, or
iii. the current number of frames queued in queue 204-i, or
iv. the latency tolerance of application i, or
v. the throughput requirements of application i, or
vi. the current number of frames queued in queue 204-i divided by $N_i$.

It will be clear to those skilled in the art how to coordinate the selection of frames from queues 204-1 through 204-L.

At task 304, processor 203 determines the amount of time, $T_i$, that is to be afforded to the transmission of frames for queue 204-i at this transmission opportunity. The value of $T_i$ can be static or dynamic and can be the same for each station or different at each station. In accordance with the illustrative embodiment, each station determines its own values for $T_i$ for each queue, and the value is updated periodically or sporadically. In accordance with the illustrative embodiment of the present invention, the value for $T_i$ is based on:

i. the number of queues that have frames queued for transmission, or
ii. the number of frames queued in queue 204-i, or
iii. the latency tolerance of application i, or
iv. the throughput requirements of application i, or
v. the current number of frames queued in queue 204-i divided by $N_i$, or
vi. any combination of i, ii, iii, iv, and v.

For example, applications that are more latency intolerant might be given larger values of $T_i$ than applications that are less latency tolerant and applications that have greater throughput requirements might be given larger values of $T_i$ than applications that have lesser throughput requirements. It will be clear to those skilled in the art, after reading this specification, how to determine and use other criteria for establishing $T_i$ for application i.

To accomplish task 304, processor 203 advantageously maintains a table that correlates $T_i$ and the number of frames queued in each queue to i. Table 1 depicts an illustrative version of this table.

TABLE 1

Queued Frame Database

| i | Number of Frames Queued in Queue 208-i | $T_i$ |
|---|---|---|
| 1 | 13 | 23 ms. |
| 2 | 7 | 25 ms. |
| ... | ... | |
| L | 42 | 7 ms. |

At task 305, processor 203 removes from queue 204-i the lesser of:

i. the number of frames queued in queue 204-i, and
ii. $N_i$, wherein $N_i$ is a positive integer, and transmits them, as a contention-free burst, into the shared-communications channel, in well-known fashion. In accordance with the illustrative embodiment, the value of $N_i$ is based on:

i. the time needed to transmit the next $N_i$ data frames of queue 204-i in $T_i$ seconds, or
ii. the time needed to receive $N_i$ acknowledgement frames in $T_i$ seconds, or
iii. the time needed for $O(2N_i)$ short interval spaces, or iv. whether there will be a request-to-send frame, and if so, the time needed to transmit the request-to-send frame and receive the associated clear-to-send frame, or
v. the time needed to retransmit any of the $N_i$ data frames due to transmission failures, or
vi. any combination of i, ii, iii, iv, and v.

In accordance with the illustrative embodiment, the value of $N_i$ is less than the value of M because station 200 exercises self-restraint in the number of frames that it transmits at each transmission opportunity. This prevents the shared-communications channel from being monopolized or hogged by one application and lessens the amount of time that other applications have to wait before gaining access to the shared-communications channel.

When each station exercises such self-restraint, the applications that continually need access to the shared-communications channel—because of their relative latency intolerance—get the best opportunity to get the resources that they need.

Figure 4:
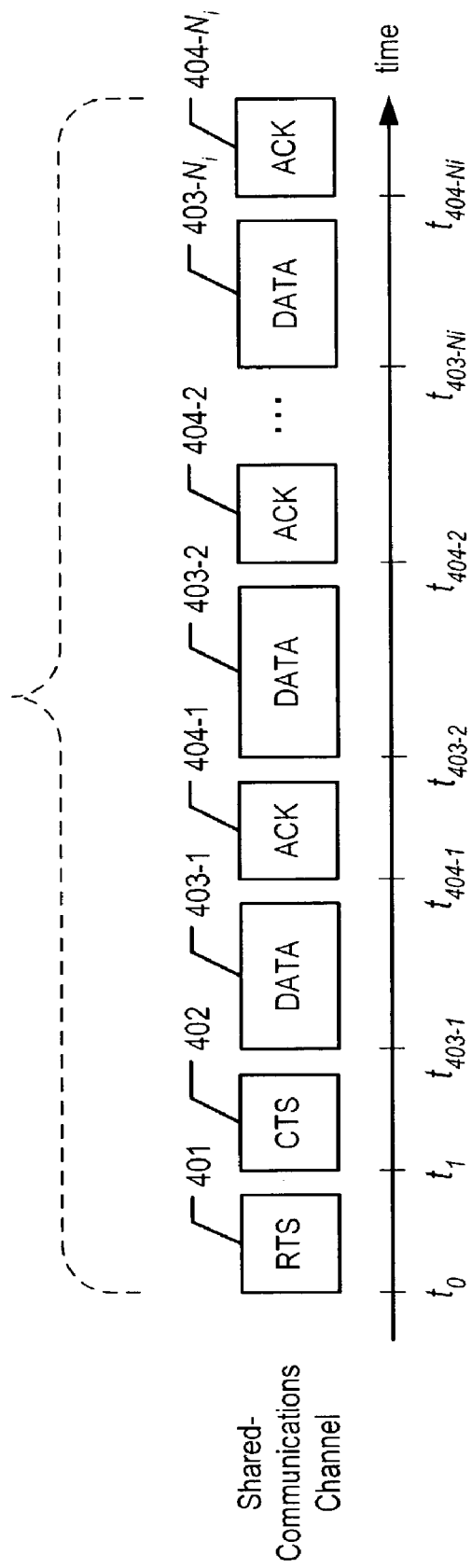
FIG. 4 depicts a timeline of the frames transmitted in accordance with the illustrative embodiment of the present invention.

FIG. 4 depicts a timeline of the frames transmitted in accordance with the illustrative embodiment of the present invention. Before time t$_o$, station 200 has obtained a transmission opportunity to transmit M frames into the shared-communications channel, and station 200 has decided to use that opportunity to send one or more frames associated with application i.

At time t$_o$, station 200 transmits an IEEE 802.11 Request-to-Send frame (RTS 401) that comprises a duration field to a remote station, in well-known fashion. In accordance with the illustrative embodiment, the duration field of the Request-to-Send frame comprises a value that is based on the lesser of N$_i$ and the number of frames queued in queue 204-i. Typically, the value in the duration field is also based on an estimate of the length of time necessary for the transmission of the Clear-to-Send frame, the data frames, the acknowledgement frames, and the short interframe spaces between the frames. As is well-known to those skilled in the art, this invokes the virtual carrier sense mechanism in the stations that receive the message to refrain from transmitting while station 200 is transmitting the frames associated with application i.

At time t$_1$, the remote station transmits an IEEE 802.11 Clear-to-Send frame (CTS 402) in response to the Request-to-Send frame, in well-known fashion. The Clear-to-Send frame comprises a duration field comprises a value that is that is based on the lesser of N$_i$ and the number of frames queued in queue 204-i. Typically, the value in the duration field is also based on an estimate of the length of time necessary for the transmission of the data frames, the acknowledgement frames, and the short interframe spaces between the frames.

At time t$_{403\text{-}1}$, station 200 transmits an IEEE 802.11 data frame (Data 403-1), which results in the transmission at time t$_{404\text{-}1}$ of an IEEE 802.11 acknowledgement frame (ACK 404-1). Data frames 403-2 through 403-N$_i$ are subsequently transmitted by station 200 and are interleaved with acknowledgement frames 404-2 through 404-N$_i$. After the receipt of acknowledgement frame 404-N$_i$, another application is given the opportunity to transmit on the shared-communications channel.

It is understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method, comprising:
   queuing data frames to be transmitted during a transmitting station's transmit opportunity, wherein the data frames are queued in a queue, wherein the transmit opportunity corresponds to a length of time during which the transmitting station will transmit data frames from the queue to a shared-communications channel, and wherein the transmit opportunity is commenced with a control frame; and
   setting a length of time for the transmit opportunity based on a priority of the queue.

2. The method of claim 1, wherein the queue is one of a plurality of queues, wherein each queue of the plurality of queues has a different priority, and wherein the method further comprises determining which queue of the plurality of queues from which to transmit data frames to the shared-communications channel during the transmit opportunity.

3. The method of claim 1, further comprising determining a number of the data frames to be transmitted during the transmit opportunity based on the length of time of the transmit opportunity.

4. The method of claim 3, farther comprising transmitting the determined number of data frames from the queue to the shared-communications channel during the transmit opportunity.

5. The method of claim 1, further comprising transmitting a number of the data frames from the queue to the shared-communications channel based on the length of time of the transmit opportunity.

6. The method of claim 1, wherein the priority of the queue is based on a class of service associated with the data frames queued in the queue.

7. The method of claim 6, wherein the class of service associated with the data frames in the queue is based on one or more quality of service (QoS) parameters.

8. A system, comprising:
   a first queue configured to store data frames to be transmitted during a transmitting station's transmit opportunity, wherein the transmit opportunity corresponds to a length of time during which the transmitting station will transmit data frames from the first queue to a shared-communications channel, and wherein the transmit opportunity is commenced with a control frame; and
   a processor configured to determine the length of time of the transmit opportunity based on a priority of the first queue.

9. The system of claim 8, further comprising a second queue, wherein the first and second queues have different priorities, and wherein the processor is further configured to determine which of the first or second queues from which to transmit data frames to the shared-communications channel during the transmit opportunity.

10. The system of claim 9, wherein the processor is further configured to determine a number of the data frames to be transmitted from the determined queue to the shared-communications channel during the transmit opportunity based on the length of time of the transmit opportunity.

11. The system of claim 10, further comprising a transmitter associated with the processor, the transmitter configured to transmit the determined number of data frames from the determined queue to the shared-communications channel during the transmit opportunity.

12. The system of claim 8, further comprising a transmitter associated with the processor, the transmitter configured to transmit a number of the data frames from the first queue during the transmit opportunity based on the length of time of the transmit opportunity.

13. The system of claim 8, wherein the priority of the first queue is based on a class of service associated with the data frames queued in the first queue.

14. The system of claim 13, wherein the class of service associated with the data frames in the first queue is based on one or more quality of service (QoS) parameters.

15. The system of claim 8, further comprising additional queues, wherein each of the additional queues has a priority different than the priority of the first queue.

16. A method, comprising:
   queuing frames to be transmitted during a first transmit opportunity and a second transmit opportunity, the frames queued in a plurality of queues, the first and second transmit opportunities each commenced with a respective control frame, the plurality of queues comprising first and second queues; and setting a first length of the first transmit opportunity and a second length of the second transmit opportunity based on a first priority of the first queue and a second priority of the second queue, respectively.

17. The method of claim 16, wherein the control frame comprises a request to send (RTS) frame.

* * * * *

UNITED STATES PATENT AND TRADEMARK OFFICE
CERTIFICATE OF CORRECTION

| | |
|---|---|
| PATENT NO. | : 7,684,318 B2 |
| APPLICATION NO. | : 10/383339 |
| DATED | : March 23, 2010 |
| INVENTOR(S) | : Maarten Menzo Wentink and Ronald A. Brockmann |

It is certified that error appears in the above-identified patent and that said Letters Patent is hereby corrected as shown below:

Claim 2, column 5, lines 64-65, delete "farther" and replace with --further--.

Claim 4, column 6, line 5, delete "farther" and replace with --further--.

Signed and Sealed this

Third Day of August, 2010

David J. Kappos
*Director of the United States Patent and Trademark Office*